INVENTOR.
NOBORU ARAIKAWA

United States Patent Office 3,481,437
Patented Dec. 2, 1969

3,481,437
ONE WAY POSITIVE CLUTCH WITH SNAP OPERATOR
Noboru Araikawa, Nagasaki-shi, Japan, assignor to Mitsubishi Jukogyo Kabushiki Kaisha, Tokyo, Japan
Filed Dec. 13, 1967, Ser. No. 690,213
Claims priority, application Japan, Dec. 17, 1966, 41/82,516
Int. Cl. F16d 25/08, 1/10
U.S. Cl. 192—89 2 Claims

ABSTRACT OF THE DISCLOSURE

A device for coupling two shafts which are rotating at slightly different speeds includes a driving part affixed to a driving shaft having a plurality of driving gear teeth and a driven part affixed to the driven shaft having spirally formed teeth, and with a coupling sleeve which is adapted to be shifted from a position at which it encompasses and engages just the teeth of the driving shaft to one in which it engages both the teeth of the driving shaft and the driven shaft. The coupling sleeve includes two sets of teeth, one set being in constant engagement with the teeth of the driving shaft, the other set being spaced from the first set by being in axial alignment therewith are located at the end of the sleeve adjacent to the shaft to be driven. The sleeve is supported on a non-rotatable collar which permits rotation of the sleeve. The collar is supported by a lever arm which may be pivoted to shift the collar and the sleeve axially for the purposes of engaging and disengaging the driven shaft. The operating mechanism for shifting the collar includes a fluid pressure cylinder which is connected through a spring linkage to the lever arm in a manner such that the spring force acting to shift the lever arm and the collar increases past a midway point of shifting movement so that the collar and the gears thereof are held in driving engagement after the coupling has been effected. For disengagement only a slight biasing force is imparted to the sleeve to urge it in a disengaging direction. The actual disengagement is effected by the gear teeth when the driving shaft is reduced in speed.

Summary of the invention

This invention relates in general to coupling devices and in particular to a new and useful coupling for coupling together two shafts when they are rotating but at slightly different speeds.

The coupling of the present invention is an improvement over the prior art, particularly in respect to the simplicity of the operating part construction, and in respect to the shifting mechanism which provides for a change of spring biasing force to hold the coupling in an engaged position and permits an automatic disengagement when the driving shaft is rotated at a slower speed than the driven shaft. The device is particularly suitable for connecting and disconnecting a main engine to an auxiliary machine, such as a generator, which may be also driven by an auxiliary engine to which it is permanently connected. The coupling is such that the connection may be effected when the auxiliary machine and the main engine are rotating and the differences of revolutions per unit of time between the main engine and the auxiliary engine are relatively few.

Accordingly, it is an object of the invention to provide an improved coupling for engaging and disengaging the rotating shafts of operating parts while they are rotating.

A further object of the invention is to provide a coupling device which includes engageable driven and driving gear teeth on respective driven and driving shafts with a collar member having a set of gear teeth which are always engaged with the driving shaft and another set in axial alignment therewith which may be shifted into engagement with the gear teeth of the driven shaft and wherein the gear teeth of the driven shaft are advantageously inclined or of a spiral configuration, and preferably including spring or lever means for shifting the sleeve which provides a controlled resilient biasing during the shifting movement of the coupling sleeve.

A further object of the device is to provide a coupling which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

Detailed description of the preferred embodiment

Figure 1:
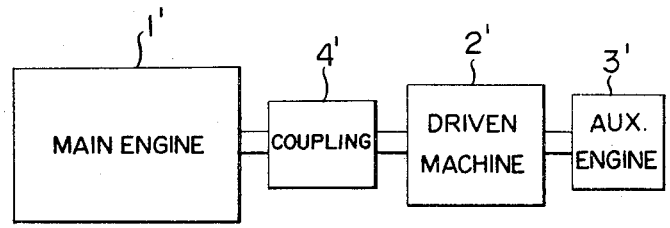
FIG. 1 is a diagrammatic illustration of the connection of the coupling device between a main engine and an operating machine.

Referring to the drawings, in particular, the invention as embodied therein comprises a coupling device 4' which is adapted to be connected between a main engine 1' and a driven machine, such as a generator 2' as indicated in FIG. 1. An auxiliary engine 3' is connected to the driven machine 2' by a fixed connection for driving the driven machine whenever the machine 2' is disconnected from the main engine 1'. Normally, while the coupling mechanism 4' is connected to drive from the main engine 1' to the driven machine 2', the auxiliary engine 3' will be running under no load conditions.

Figure 2:
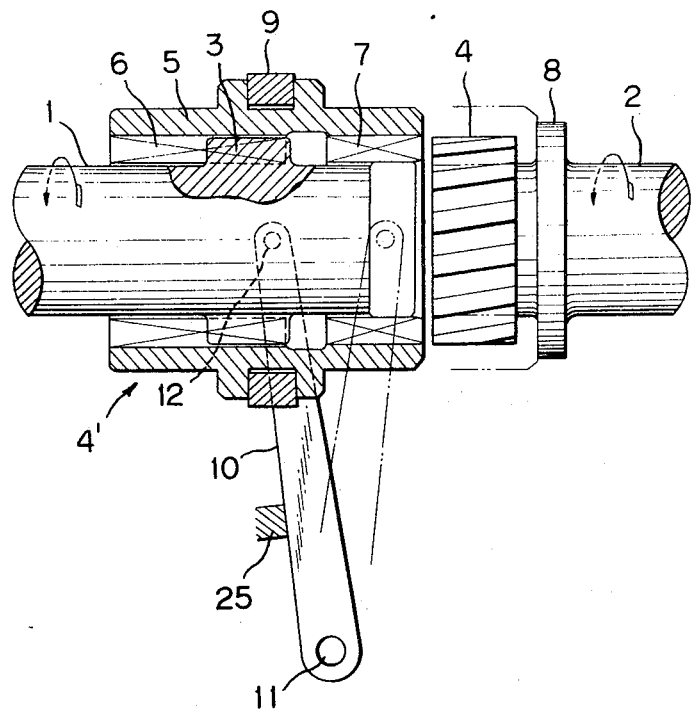
FIG. 2 is a partial axial sectional view and side elevation of a coupling constructed in accordance with the invention.
Figure 3:
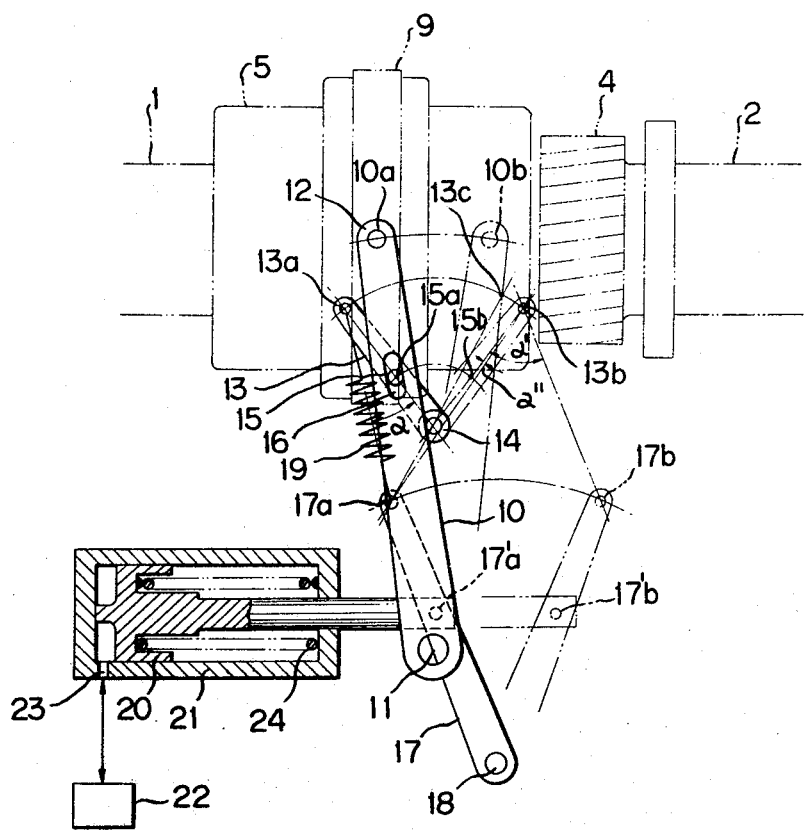
FIG. 3 is a side-elevational view, partly in section, of the coupling operating mechanism.

Referring to FIGS. 2 and 3, the coupling of the invention comprises a driving shaft 1 of a main engine 1' which is disposed in end-to-end relationship with a driven shaft 2 of a driven machine 2' which is to be coupled to the driving shaft 1' through the coupling mechanism generally designated 4'.

In accordance with the invention, the coupling mechanism 4' includes driving elements or teeth 3 which are formed on the driving shaft 1 and driven elements or teeth 4 which are formed on the driven shaft 2, and a coupling member or sleeve 5 which is carried on a driving shaft 1 and which may be moved to the right, as indicated in FIG. 2, to complete the coupling engagement between the gears of the driving shaft 1 and the driven shaft 2.

The coupling sleeve 5 is provided with interior engaging teeth 6 which extend from substantially the central interior of the sleeve 5 to the driving shaft end of the sleeve. In the operating range of movement of sleeve 5 the teeth 6 will be in engagement with the teeth 3 of the driving shaft 1, so that the sleeve 5 will continuously rotate with the driving shaft. The sleeve 5 also includes coupling teeth or engaging teeth 7 which extend inwardly from the driven shaft end of the sleeve 5. When the sleeve 5 is moved to the dotted line position indicated in FIG. 2, the teeth 7 will engage with the teeth 4 of the driven shaft 20.

In accordance with a feature of the invention, the engaging teeth 4 and 7 are spirally formed with an inclination in respect to the axes of the shafts 1 and 2 in order to facilitate engagement and to permit initiation of disengagement when the shafts are running at different speeds. The construction is such that when the main engine 1' runs at a lower revolution than the rotation of the driven machine, which will be caused by the driving of the machine 2' by the auxiliary engine 3' and a decrease in the number of revolutions of the main engine 1', then an axial component of force is imparted to the coupling member 5 to move it to the disengaging position to the left, as shown in FIGS. 2 and 3. A flange 8 is formed on the driven shaft for the purpose of preventing the coupling member 5 from being urged beyond a position at which the teeth 7 are properly engaged with the teeth 4. This is necessary to overcome any component of force imparted by the engaging teeth 4 to the teeth 7 when the driving shaft 1 drives the driven shaft 2.

The sleeve 5 is mounted for rotation within a ring 9. The ring 9 is connected to the outer end of a lever member 10 which is pivotably supported on a fixed point on a pivot pin 11. A pin 12 pivotably connects the end of the lever to the ring 9.

A feature of the inventive construction is the means for shifting the sleeve 5 which include a resilient linkage connection to the lever 10. The resilient linkage connection includes a lever or operating lever 13 which is pivoted at its inner end on a fixed pivot 14 and which includes a pin 15 which is confined in an axially elongated slot 16 defined on the lever 10. The outer end of the lever 13 is connected to the outer end of longer lever or control lever 17 which is pivotable about a fixed pivot 18 located below the pivot 11.

The engaging mechanism includes a driving element or control comprising a fluid motor which includes a hydraulic piston 20 which is slidable within a fluid cylinder 21. The piston 20 is urged to the left by a control spring 24 disposed between the piston and one end of the wall of the cylinder, and the opposite end includes an opening 23 to permit admission of an operating fluid under pressure in order to drive the piston to the right against the biasing force of the control spring 24.

A pilot or control device 22 is connected to the port 23 in order to supply or remove fluid pressure to provide for the actuation of the piston 20 and therefore to provide for proper engagement and disengagement of the coupling.

The control is connected through the piston 20 to the pivoting control lever 17 intermediate its length so that it can move the control lever from the solid line position indicated in FIG. 3 to the dotted line position. When this is done, the pivot point 17a may be moved to the location 17b to cause a corresponding pivotal movement of the lever 13 through the interconnection of a biasing spring or actuating spring 19 which is connected to the outer end of each of the levers 17 and 13. The lever 13 will then shift to the dotted line position to move the pivot 13a to the location 13 and to cause a corresponding shifting movement through the interconnected pin and and slot arrangement 15 and 16 to shift the pivot 12 from the position 10a to the position 10b. In the position 10b the coupling sleeve 5 will be oriented to cause interengagement of the teeth 7 and 4, while the teeth 3 and 6 remain in engagement and hence the rotation of the shaft 2 with the shaft 1. A stop or fixed abutment 25 limits the amount of travel of the lever 10 in the return direction and the sleeve 8 of the shaft 2 limits the movement of the mechanism in the engaging direction.

The elastic coupling mechanism is advantageously constructed so that the elastic force may be little affected by any difference in overall length of the springs 16 and 24.

The operation of the device is as follows: In the solid line position indicated in FIGS. 2 and 3, the cylinder 21 is drained of any fluid pressure on the lefthand end of the piston 20, so that the piston 20 is forced by the spring 24 to the left. This urges the lever 10 against the stop 25 in a disengaged position. In the disengaged position the spring 19 urges the lever 13 in a counter-clockwise direction. When the coupling between the main engine 1' and the driven machine 2' is desired, the relative speeds of the shafts 1 and 2 are regulated such that the number of revolutions of the driving shaft 1 only slightly exceeds that of the driven shaft 2, for example, by 5 revolutions per minute. At this condition, hydraulic fluid is directed by a control 22 through the inlet 23 to force the piston 20 to the right and shift the pivot connection 17'a to the location 17'b. As a result, lever 13 is correspondingly shifted and the position of the spring 19 changes from the orientation 17a to the orientation 13b–17b. The lever 13 is therefore given a clockwise torque by the elasticity of the spring 19. This torque is transmitted to the lever 10 which in turn is rotated clockwise and urges the coupling sleeve 5 toward the driven shaft 2 to effect engagement of the gear 7 with the gear 4. Upon completion of the engagament, the connecting point of the ring 9 and the lever 10 is shifted from 10a to 10b as indicated in FIG. 3. During the shifting the spring 19 does not undergo any material change in elasticity despite the minor change in its elongation. Therefore, the force of the spring 19 acting on the lever 13 depends on the working angle defined by the lever 13 and the spring 19. When the elastic mechanism described is constructed to have a working angle relationship of $\alpha' > \alpha$ ($\alpha$ being the angle of inclusion between the spring axis and the axis of the lever 13 at the initial non-operative position, and $\alpha'$ being the angle between the axis of the lever 13 and the spring in the fully operative or coupled position), the force exercised upon the lever 13 following the engagement is increased over the force before the engagement sufficiently to force the coupling member 5 against the collar 8 to maintain the driving engagement during operation.

After the coupling has been completed, the output of the auxiliary engine 3' is gradually increased until the driven machine 2' is entirely driven by the main engine 1'.

If it is desired to disengage the main engine 1' from the driven machine 2', the pilot 22 is actuated to drain hydraulic fluid from the cylinder 21 to permit the piston 20 to return back to the position indicated in FIG. 3. The operator then increases the output of the auxiliary engine 3' so that an increased percentage of the load power caused by the driven machine 2' is carried by the auxiliary engine 3' and the power transmitted from the main engine 1' through the shaft coupling 4' is gradually decreased. When the load of the driven machine 2' and the output of the auxiliary engine 3' have been balanced, the torque to be transmitted by the shaft disengaging coupling 4' is brought to zero. When the output of the auxiliary engine 3' has exceeded the load of the driven machine 2' or when the number of revolutions of the main engine is decreased below that of the auxiliary engine 3', power is then transmitted from the auxiliary engine 3' to the main engine 1'.

Thus, when the driven shaft 2 has come to move ahead of the driving shaft 1, the engaging teeth 7 of the coupling member 5 are subjected to a component of force directed leftwardly due to the spiral configuration of the teeth 4 and 7. At this time, the spring 19 will be oriented along the line 13b–17a, and therefore the working angle $\alpha''$ is extremely small and provides no resistance to the leftward movement of the coupling member 5. However, once the coupling member 5 disengages and moves leftwardly and the lever 13 passes across the line 17a–13c, then the elastic force of the spring 19 which acts on the lever 13 will aid in a counter-clockwise movement and disengagement of the coupling member. This movement causes a corresponding repositioning of the spring 19 so that the returning force is increased as the lever 10 is moved backwardly toward the stop 25. After the coupling member 5 has been disconnected from the driven shaft 2, the output of the auxiliary engine 3' is controlled to proceed in operation without the main engine 1'.

A feature of the construction is that the disengagement of the coupling sleeve 5 is automatic once the auxiliary engine 3' is gradually brought up to an operating speed so that it assumes the load of the driven machine 2'. Thereafter, when the main engine 1' is slowed down, the coupling will disengage automatically due to the configuration of the teeth 4 and 7.

A principal feature of the resilient link mechanism for effecting engagement and disengagement of the sleeve 5 is that engagement of the teeth 7 with the teeth 4, which is accomplished when the machines are rotating at slightly different speeds, will take place under a slight biasing force urging engagement, so that there will be no danger of any damage to the teeth. Disengagement of the coupling takes place automatically when the speed of the main engine 1' is reduced after the auxiliary engine 3' has already taken over the load and has begun operating under the control of its governor.

While a specific embodiment of the invention has been shown and described in detail to illustrate the application of the inventive principles, it will be understood that the invention may be embodied otherwise without departing from such principles.

What is claimed is:

1. A coupling comprising a first engaging element having first engaging teeth adapted to be connected to a driving shaft, a second engaging element having second engaging teeth adapted to be connected to a driven shaft, a coupling sleeve surrounding said first engaging element and having first drive teeth engaged with said first engaging teeth and being axially displaceable relative thereto without disengaging, said coupling sleeve having second drive teeth engageable with said second engaging teeth, means mounting said sleeve for axial movement from a disengaged position with said second drive teeth out of engagement with said second engaging teeth to an engaged position in which the sleeve overlies said second engaging teeth of said driving shaft and said second drive teeth are interengaged with said second engaging teeth, a lever pivotably mounted adjacent its one end and pivotably connected to said sleeve adjacent its opposite end, resilient link means connected to said lever and biasing said lever in a disengaged position and being movable to move said lever and said sleeve to a position in which it is urged toward an engaged position and, after engagement holds said lever and said sleeve in an engaged position with a relatively high biasing force, said resilient link means including a relatively small operating lever having an outer end and an inner end and having a pin projecting outwardly therefrom intermediate its length confined in a slot of said lever, a control lever having a pivot end and an opposite end, said control lever being pivotably mounted adjacent said pivot end, a spring interconnecting said outer end of said operating lever with said opposite end of said control lever, means for moving said control lever, said control lever being pivoted at a location below said operating lever and below said lever, said spring being located beyond the central line of said lever in a non-operative position and holding said operating lever in a direction to urge said lever in a non-operative position, said spring being shiftable by movement of said control lever to a position in which it urges said operating lever in a direction to urge engagement of said sleeve, the end location being such that the angle between said spring and control lever is initially greater than the angle between said spring and said control lever at a disengaged position of said control lever.

2. A coupling according to claim 1, wherein said means for moving said control lever includes a fluid cylinder, a piston slidable in said cylinder and connected to said operating lever intermediate its length, spring means urging said piston in a direction to position said operating lever in a disengaged position, and fluid pressure means adapted to be admitted connected to said cylinder to admit fluid pressure thereto to urge said piston against said spring to an engagement.

References Cited
UNITED STATES PATENTS

| 1,540,247 | 6/1925  | Bowman.  |
| 1,949,168 | 2/1934  | Maybach. |
| 2,177,052 | 10/1939 | Blough.  |

BENJAMIN W. WYCHE III, Primary Examiner

U.S. Cl. X.R.

74—97; 192—.098, 46, 85, 99